July 13, 1965  J. E. LINDBERG, JR  3,195,121
APPARATUS FOR HEAT DETECTION
Filed Feb. 29, 1960  4 Sheets-Sheet 1

INVENTOR.
JOHN E. LINDBERG, JR
BY
ATTORNEY

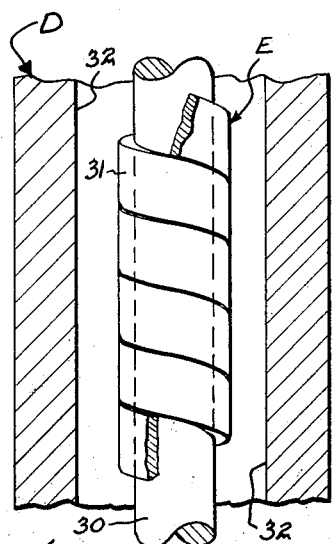
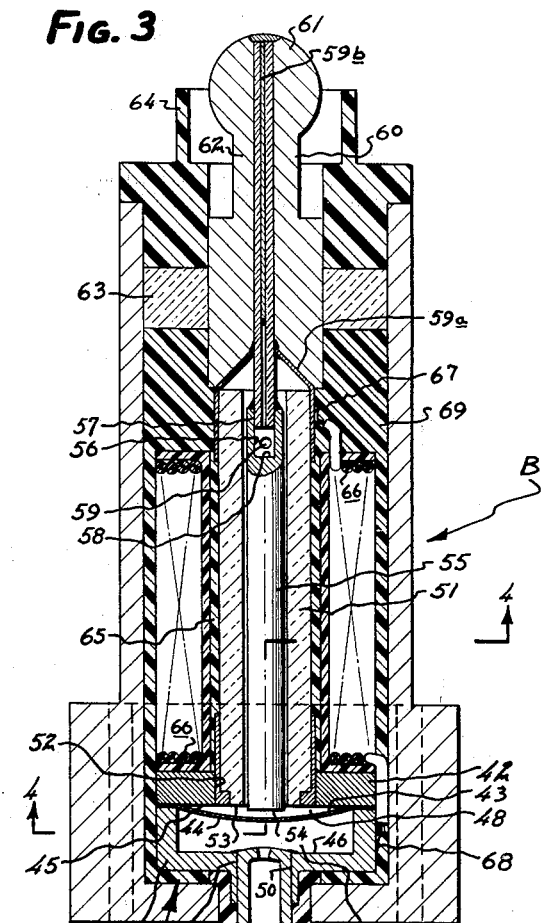
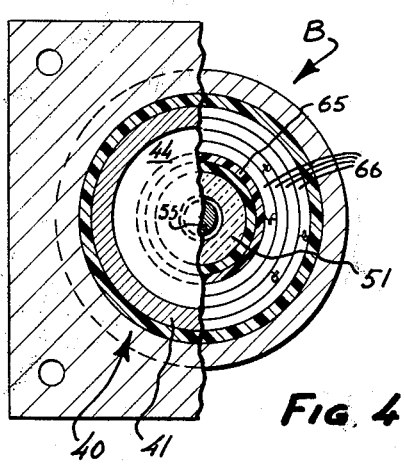

July 13, 1965                J. E. LINDBERG, JR                3,195,121
                         APPARATUS FOR HEAT DETECTION
Filed Feb. 29, 1960                                       4 Sheets-Sheet 3

INVENTOR.
JOHN E. LINDBERG, JR.
BY
ATTORNEY 3,195,121
APPARATUS FOR HEAT DETECTION
John E. Lindberg, Jr., 1211 Upper Happy Valley Road, Lafayette, Calif.
Filed Feb. 29, 1960, Ser. No. 11,710
18 Claims. (Cl. 340—229)

This invention relates to an improved apparatus for heat detection and especially fire detection.

The present invention is an improvement of the apparatus described and claimed in my co-pending application, Serial No. 815,406, filed May 25, 1959, now Patent No. 3,122,728. That application provides a novel non-electric heat-detecting element or sensor located in a heat-detection zone and connected outside the zone to an electrical warning or corrective system by a novel instrument called a responder. The sensor may be filamentary—a long, very-narrow-diameter, hollow tube, which may extend along a line, around a circle, or along any desired path and for practically any desired length. Also, the actual alarm or heat-condition indicator can be connected to the responder by a wire of practically any desired length. For example, the heat-detecting sensor may be inside a house, the responder just outside the house, and the indicator at the fire station. Or, the non-electric heat-detecting sensor may be in zone 1 of an aircraft engine ahead of a fire wall, the responder may be behind the fire wall, and the indicator may be on the aircraft instrument panel.

Conventional fire detectors employed in aircraft for zone-1 fire detection, whether of the continuous type or of the single-point type, have been liable to give false alarms. For example, a prevailing type of continuous fire detector is actuated by the change in electrical resistance of semi-conducting materials caused by a change in environmental temperature. Moisture, however, can produce the same effect as high temperatures. Moisture conditions in the engine chambers, where zone-1 detectors are located, vary considerably, because changes in altitude radically affect the temperature and pressure conditions there. As a consequence, moisture condensation occurs frequently and has often caused these electrical fire-detectors to develop low-resistance shorts that resulted in false alarms. False alarms are serious enough on the ground, as everyone knows, but in aircraft they are unforgivable, because the crew must immediately take hazardous and expensive emergency action.

The present invention solves the false-alarm problem. Like the device described in application Serial No. 815,406, the sensor is never actuated by moisture or by atmospheric conditions. In addition, it includes an improved circuit.

Such troubles as poor electrical connections at the joints between successive elements of continuous-type detectors, and the accumulation of foreign material in the connections, both leading to heating at the joints, cannot occur in this invention. My invention uses only the simplest electrical connections.

Some prior-art types of fire detectors have given false alarms because they responded to the rate of change of temperature rather than, or in addition to, a predetermined high temperature level. Consequently, during airplane takeoff, when the temperature in the power-plant area was increasing very rapidly, these detectors sometimes gave false alarms when everything was normal. The same thing happened during rapid climbing and some other operating conditions. The device of this invention is not affected by the rate of change of temperature; so another source of false alarms is eliminated.

Prior-art continuous-type fire detectors also gave false alarms whenever the detector element was seriously damaged, because short circuits were then caused within the element. The sensor of the present invention can be completely severed, cut open, dented, or bent in any fashion without causing a false alarm. Moreover, test circuits are provided to show whether the sensor is damaged.

An outstanding feature of the invention is that the warning circuit can be operated at very low impedance, often less than one ohm. This feature greatly increases the reliability of the system, for this impedance is so low that, especially when the circuit is used with high-amperage currents, complete immersion of the circuit in salt water does not seriously affect its operation.

Another object of the invention is to provide a fire detector substantially lighter in weight-per-length than previous fire detectors, an important feature because every pound saved in equipment means that additional payload is available. In modern transport aircraft, each pound saved in manufacture is considered to be worth about sixty to one hundred dollars. The fire detector of the present invention weighs only about one-seventh as much as the lightest comparable prior-art detectors.

A further object is to provide a fire detector capable of indefinitely recycling to give warning each time a critical elevated temperature is reached and to withdraw the warning each time the temperature drops.

Another object is to provide a fire-detection system which avoids the complexities characteristic of other fire detectors. For example, no amplifiers or relays need be used in this system, except that if audible warning is desired, a bell-ringing relay may be included.

Another object is to provide a completely hermetically sealed heat-detection transducer, completely free from environmental errors caused by such things as pressure and altitude changes, moisture condensation, and so on.

Another object of the invention is to enable the use of several non-electric heat-detecting transducers in combination with a single electrical circuit, to achieve simplicity while still pin-pointing which transducer has been actuated.

Other objects and advantages of the invention will appear from the following description of some illustrative embodiments thereof.

In the drawings:

FIG. 3 is a further enlarged view in elevation and in section of the responder of FIG. 2.

FIG. 4 is a view taken in section along the line 4—4 in FIG. 3.

FIG. 5 is a greatly enlarged view in elevation and in section of a portion of one preferred form of heat-detection sensor.

Figure 1:
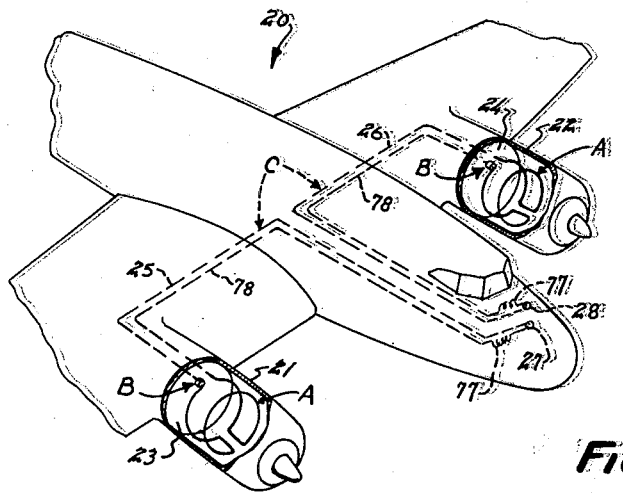
FIG. 1, is a diagrammatic fragmentary view in perspective of a portion of an aircraft containing a fire-detection and warning device embodying the principles of this invention.

As shown in FIG. 1, the fire-detection system of this invention comprises (1) a non-electric detection means, preferably in the form of a generally filamentary sensor A of indeterminate length, (2) a responder B, and (3) an electrical circuit C. The function of the sensor A is to actuate the responder B, which in turn actuates the electrical circuit C. Thus, the sensor A constitutes a heat-to-pressure transducing means, while the sensor A and the responder B, considered together, comprise a heat-to-electric current transducer.

The sensor A may be further defined in general terms (see FIGS. 2 and 5) as a generally filamentary enclosure D of extended length connected to the responder B and containing means E responsive to heat in the environment of the sensor A, for raising the internal pressure in the responder B. The responder B is a type of pressure-actuated electrical switch that opens or closes in response to the pressure changes induced by the response of the sensor A to heat. The electrical circuit C may be a warning circuit or a remedial circuit.

The system of this invention has may features especially suitable to use in aircraft. Just to give a general picture that can be referred to from time to time, FIG. 1 presents an aircraft 20 in which two systems of this invention are installed. Two sensors A are used, one for each of two engine nacelles 21, 22 of this airplane 20. The sensors A are disposed at critical locations in the nacelles 21, 22, usually around the engines, and the responders B are mounted on the fire walls 23, 24. The circuits C include conductors 25, 26 leading to respective lights 27, 28 on an instrument panel. Fire at either engine nacelle 21 or 22 heats the sensor A therein and causes its associated responder B to close its associated circuit C, thereby lighting the light 27 or 28.

The sensor A includes a narrow-diameter metal tube D of constant cross-sectional area and of any desired length. Within this tube D is means E responsive to the temperature of the tube D for varying the pressure inside the tube or enclosure D. This means E may also be termed a transducing agent or a gas-emitting agent. The enclosure D is gas-tight and its only opening is connected to the responder B, which itself defines a closed chamber connected to the enclosure D. An alteration of the internal pressure within the enclosure D therefore affects the internal pressure within the responder B.

This invention employs the transducing agents E that are set out in detail in my co-pending application, Serial No. 815,406, to which reference may be had for complete details. These transducing agents E release or emit large volumes of gases or vapors when elevated to a temperature sought to be detected.

As explained in application Serial No. 815,406, several basic types of material are suitable transducing agents E: (1) materials such as Celogen and other blowing agents, which do not emit gas until a triggering temperature is reached and then emit it sharply and quickly; (2) materials that retain gas at low temperatures and emit gas progressively over a wide range of elevated temperatures; and (3) materials that retain relatively small quantities of gas at low temperatures and absorb large quantities of gas as the temperature is elevated over a wide range.

The blowing agents are useful for "one shot" or non-cyclical processes. Their process of gas emission is classified as irreversible, for once the gas has been released, it cannot be recombined with the remaining solids except under the most extreme treatment.

Class (2) above includes heat-dissociable materials, which, when subjected to an increase in temperature, emit gas and, when cooled, take up gas. Among these materials are many hydrides and some borohydrides. With the alkali and alkaline earth metals, i.e., groups I–a and II–a of the periodic table, hydrogen forms stoichiometric compounds such as sodium hydride and calcium hydride. These are ionic in behavior, with hydrogen as the negative ion. The reactions are reversible and exothermic. Specifically, hydrogen reacts with lithium, sodium, potassium, rubidium, cesium, calcium, radium, strontium, francium, and barium, in stoichiometric proportions to form hydrides. Hydrogen reacts with aluminum to form aluminum hydride and complex alumino hydrides such as lithium alumino hydride, magnesium alumino hydride, and sodium alumino hydride. With the elements of Groups III–a (including the rare earth and actinide elements), IV–a and V–a, hydrogen forms pseudo-hydrides. The solubility of hydrogen in elements of these groups varies as the square root of the pressure, and it decreases with increase in temperature. Above about 300° C., palladium also behaves in this way. Elements of these groups are designated as "Group B," the class consisting of scandium, titanium, vanadium, ytterbium, zirconium, niobium, hafnium, tantalum, the rare earth metals (atomic numbers 57 through 71), and the actinide metals (atomic numbers 89 through 103), palladium being a member of this group at temperatures greater than about 300° C. This solution is commonly termed a "hydride," though it is not a stoichiometric compound.

Other transducing agents of type (2) are charcoal and some zeolites. Other examples of class (2) materials could be given, for those already mentioned do not by any means exhaust the list.

Class (3) materials, in contrast to those of class (2), absorb gas when subjected to a temperature elevation. They also may be employed to alter the internal pressure of a container in which they are enclosed. For example, hydrogen interacts with what are known as the "Group A metals," consisting of copper, silver, molybdenum, tungsten, iron, cobalt, nickel, aluminum, platinum, manganese, technetium, rhenium, osmium, iridium, ruthenium, and rhodium; chromium is a member of this group at temperatures greater than about 300° C. The action appears to be a type of solubility, and the solubility increases with increasing temperature. Certain borohydrides also behave in this manner.

Oxygen also reacts similarly with some metals, but in many cases it is difficult to distinguish between solution of oxygen and solution of oxides. However, the formation of true solutions has been determined in silver, copper, cobalt, and a few other metals.

Many other examples may be cited of gases dissolving in metals. The omission of others is not intended to exclude them from this invention.

My co-pending application, Serial No. 815,406, illustrates a few of the many ways in which the sensor A may be constructed. Transducing agents E may be used in a filamentary, pellet, or granular form, always being placed inside the sensor tube D, which is a non-porous electrically conductive tube, preferably of constant cross-sectional area. Suitable metals are nickel, pure iron (which is impermeable to many gases), stainless steel, and molybdenum, for example. In any event, the inner surfaces of the tube D should not react with the materials it contacts, including the gas involved. A typical sensor tube D is preferably about 0.040″ to 0.060″ outside diameter with a wall thickness of preferably about 0.005″ to 0.015″. Such tubes D are preferably about two to thirty feet long, although they may be longer or shorter.

FIG. 5 shows a preferred form of transducing agent E enclosed in the sensor tube D. Here the transducing agent E is a filament 30, such as zirconium wire for Group B operation or copper wire for Group A operation, and may be about 0.025″ to 0.050″ in diameter, for example. A ribbon 31 of suitable material, such as molybdenum, preferably about 0.020″ wide and 0.002″ thick, is wrapped tightly around the filamentary transducing agent 30. The ribbon 31 physically spaces the filament 30 from contact with the walls 32 of the tube D and prevents the transducing agent 30 from fusing or welding to the tube walls 32, even in the event that the sensor A is exposed to extreme heat and even if the filament 30 is fully ingassed, so that it is enlarged to nearly the internal diameter of the tube D.

As a simplified example of installation of the sensor A of FIG. 5 to the responder B, one end 33 (FIG. 3) of the tube D may be connected by a gas-tight seal to the responder B, while the other end 34 of the tube D is still open. This free end 34 may be connected to a vacuum pump and the tube D pumped free of gas. Then the tube D is heated, and then pure hydrogen is forced in through the free end 34, the zirconium filament 30 absorbing the hydrogen while it cools. When Group A material is used, hydrogen may be pumped into the tube D while the wire 30 is heated, thus ingassing it at an elevated temperature. In either event, the originally pure metal 30 is converted into an ingassed hydride. The free end 34 is then sealed off as by inserting a wire 35 and fusing it to the tube D, and the device is ready for operation. A wire 36 may be attached to the tube D beyond the fused wire 35 to serve as a draw wire and as an electrical conductor.

FIGS. 3 and 4 show one preferred form of responder B. This responder B comprises a unit 40 and has two circular plates 41 and 42, of non-porous metal, preferably molybdenum or "Kovar," between which is bonded (as by brazing) a thin metal (e.g., molybdenum or "Kovar") flexible disc or diaphragm 43. (According to Handbook of Material Trade Names, 1953 edition, published by Industrial Research Service at Dover, New Hampshire, "Kovar" is a registered trademark for an alloy of 20% nickel, 17% cobalt, 0.2% manganese, and the balance iron.) The plates 41 and 42 are hermetically sealed together and are in electrical contact for their full peripheries and over a substantial margin, but in the center the diaphragm 43 has a spherical depression 44 called a "blister," which is free to move relative to the plates 41 and 42 and constitutes the active or movable part of the diaphragm. Use of a diaphragm with a blister 44 makes possible the use of an upper plate 42 with a planar lower surface 45 and gives a more predictable response, but other diaphragm structures may be used where feasible. The lower plate 41 is formed with a recess 46 in its upper surface, and the diaphragm 43 divides the resultant cavity between the plates into two regions or chambers 47 and 48. Since the lower region 47 communicates with the sensor A, it may be called the "sensor chamber." The other region 48 is located on the opposite side of the diaphragm 43 from the sensor A; so it may be called the "anti-sensor chamber." Of course, either plate 41 or 42 may actually be made by brazing together several thin plates of the desired configuration, and the recess 46 may be provided by using a stack of preformed thin washers over a disc.

The end 33 of the sensor tube D is joined to and hermetically sealed to the lower plate 41, fitting within a hole 50. The region 47 is closed and sealed except for its communication with the lumen of the sensor tube D; so the inside of the sensor A and the sensor chamber 47 enjoy a common atmosphere to the exclusion of any other.

A tube 51 of non-porous ceramic material or other non-porous electrically-insulating material extends through an opening 52 in the upper plate 42, being hermetically sealed in place there with its lower end 53 flush with the bottom surface 45 of the plate 42. The hole 52 and tube 51 are preferably centered with respect to the blister 44. A metal electrode 54, preferably molybdenum, is provided as the lower end of a rod 55 inside the tube 51, the electrode 54 being a contact portion of the rod 55 that extends below the lower surface 45 of the plate 42. The amount by which the portion 54 extends below the surface 45 is carefully controlled so as to be uniform in each responder of any particular design.

If sufficient pressure is applied to the sensor side of the blister 44, the blister will be deflected and will make contact with the electrode portion 54, and if the deflecting force is removed, the restoring force of the blister 44 will return it to its relaxed position and thus break contact with the electrode portion 54. The force necessary to deflect the blister 44 may be chosen by proper design to accommodate a wide range of values.

The outer end of the molybdenum rod 55 is drilled axially to provide a receptacle 56 within which fits the end of a nickel capillary tube 57, which is secured to the rod 55, as by a cuplat braze, at a location short of the lower end 58 of the receptacle. A hole 59 extends radially through the wall of the receptacle 56 in between the receptacle end 58 and the end of the tube 57. A cap 59ª, preferably of Kovar or molybdenum, is brazed to the ceramic tube 51 and to the capillary tube 57, and the lengths of the tubes 51 and 57 and the rod 55 are carefully chosen to match the coefficients of expansion and the lengths of the two metal members 55 and 57 to the coefficient of expansion and the length of the ceramic member 51. The lower end 54 of the contact rod 55 may extend only about 0.0005" below the surface of the plate 42; so it is important that the protrusion of the contact portion 54 be maintained accurately. With the relative lengths of the molybdenum and nickel parts chosen so that their expansion and contraction exactly cancel those of the ceramic tube 51, whose coefficient of expansion lies between those of nickel and molybdenum, this distance is easily maintained.

The cylindrical rod 55 of molybdenum fits fairly snugly into the bore of the ceramic tube 51, while still leaving sufficient clearance for gas passage. The radial hole 59 enables passage of gas through the capillary tube 57 into the ceramic tube 51. Hence, the nickel tube 57 may be used to introduce gas under pressure into the anti-sensor chamber 48 to provide any desired pressure there, with resultant effect on the response characteristics of the blister 44. It may then be closed off by inserting a wire 59ᵇ in its outer end and brazing it to the tube 57. Then the tube 57 may be brazed to an electrical jack or socket member 60. Thus, when the blister 44 contacts the electrode 54, electric current can pass from the blister 44 to the rod 55, the tube 57, and the socket 60, to which the electric warning circuit C is connected.

The socket member 60 includes a ball portion 61 and a stem portion 62. Around the stem portion is a ceramic washer 63 which also supports a Teflon (polytetrafluoroethylene) washer 64. Around the ceramic tube 51 is a Teflon spool 65. A suitable resistor 66, either a standard resistor element of about 30 ohms or, if desired, resistance wire insulated in Teflon, may be wound around the spool 65. (In the circuit diagrams, the resistor 66, when present, is shown diagrammatically outside the responder B.) One end of this resistor 66 is connected to the socket 61 by a wire 67 and the other end of the resistor 66 is connected to either body portion 41 or 42 by a wire 68. The wire is then encased in poured or molded plastic 69, such as Teflon. Thus, it will be apparent that current can pass from the body 41 to the socket 61 in either of two ways: (1) If the blister 44 is in contact with the electrode 54, then there is a low-resistance path direct to the socket 60 through the rod 55 and tube 57. (2) At other times, when the blister 44 does not touch the electrode 54, the resistor 66 provides a relatively high-resistance path. This high-resistance path has nothing to do with the functional operation of the device, but is used in connection with testing for proper operation thereof.

In place of the 30-ohm resistor 66, it is possible to use a thermistor which will have a high resistance at low voltages and a low resistance at high voltages. This expedient has the disadvantage that thermistors are more responsive to heat and therefore should be kept where they will not be attacked by a significant amount of heat.

Figure 2:
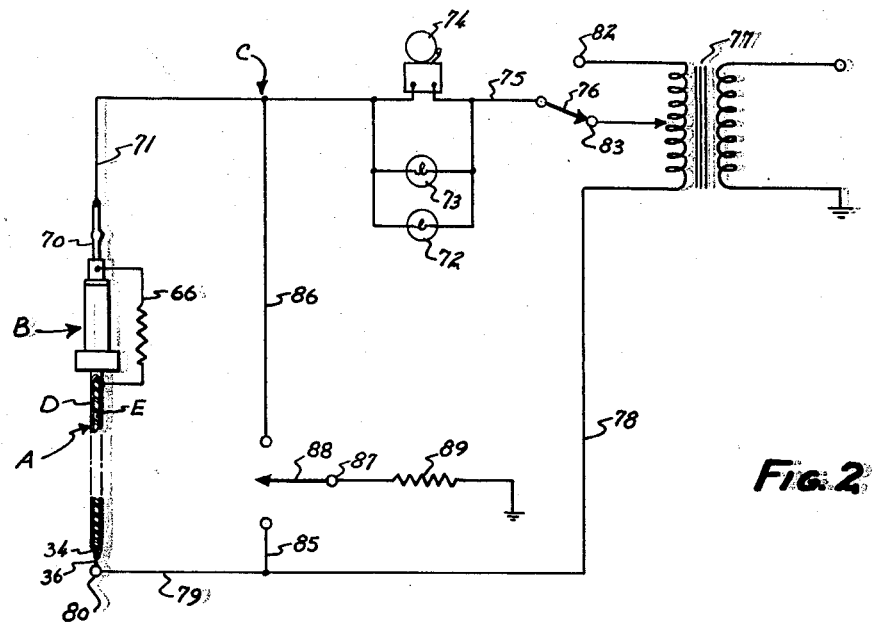
FIG. 2 is an enlarged view in elevation and partly in section of a fire detection system as used in FIG. 1, showing the responder, a heat detection sensor broken in the middle in order to conserve space, and a circuit diagram.

A preferred electrical warning circuit C is shown in FIG. 2. It will be seen that a connector 70 engages the socket 60 (FIG. 3) and from it a lead 71 extends to two lamps 72 and 73 and a bell 74, all in parallel with each other and in series with the lead 71 and a lead 75, which terminates at a switch arm 76 adjacent a transformer 77. One end of the secondary of the transformer 77 is connected by leads 78 and 79 to an electrical connection 80 to which is secured the wire 36 coming from the metallic body of the sensor A. The connector 80 may be held by the firewall 23 or 24, as may be the responder B. The body D of the sensor A is a good electrical conductor so that even with many feet of it the total resistance will be low, only about one to ten ohms. Thus an ungrounded circuit is provided through the sensor body D to the responder body 41.

When the blister 44 is not in contact with the electrode 54, the circuit current passes through the resistor 66 and is thereby attenuated to the point where it cannot light the lamps 72 and 73 or ring the bell 74. Whenever there is a fire or heat conditions such as to emit sufficient gas inside the sensor A, the pressure in the sensor chamber 47 builds up and closes the blister 44 against the electrode 54, shunting out the resistor 66 and lighting the signal lamps 72 and 73 and ringing the bell 74.

While the two-lamp, one-bell circuit is preferred, it will be apparent that, instead, there may be only a single lamp. The important thing is that there is an ungrounded circuit with a warning device in series with the responder B and sensor body D. That is, in essence, the warning circuit. Two 2.5 volt lamps 72 and 73 and 2.5 volt bell 74 are preferred to a single lamp to help get a high-current, low-voltage circuit, which is trouble free because of the current-voltage values and because even when one lamp burns out, another is present to give the warning.

The resistor 66 plays no part in the operating circuit, but it is an important part of a test circuit, which shows whether the warning circuit is operating properly. A test terminal 82 may then be used to connect the switch 76 to a higher voltage secondary portion of the transformer 77, instead of the normally-used low voltage (e.g., 4 volts) portion that leads to a terminal 83. The high voltage portion may, for example, supply 28 volts. To find out whether the warning circuit is working properly, all that need be done is to move the switch 76 against the terminal 82, and then the higher voltage passes through the circuit; this higher voltage is enough, even when passing through the 30-ohm resistor 66, to light the lamps 72 and 73 and ring the bell 74, unless some portion of the circuit is broken. Thus the operator instantly knows whether the circuit and fire detector are in operating condition. There is no need to test the operability of sensor A or responder B, since that is tested at the factory and can hardly be affected.

In addition to the parts of the circuit heretofore described, there is also a ground-test circuit to test whether the sensor A or any other part of the circuit is grounded. For this purpose, a lead 85 is connected to the juncture of leads 78 and 79, and a lead 86 is connected to the lead 71. A switch 87 has a contact arm 88 that can be connected either to the lead 85 or to the lead 86 or can remain open. The switch arm 88 is connected to ground through a resistor 89, which may have a value of one ohm (or whatever is the resistance of the sensor A), and be rated for 5 watts.

A single ground in the circuit will not produce a false warning, but there might be a false warning if both the leads 71 and 79 are grounded, in other words, both the sensor A and the anti-sensor side of the responder B would be grounded. To test whether there is a grounded portion on the high side of the responder B, the switch arm 88 is closed against the lead 85. Then, if there is a ground along the line 71, i.e., on the anti-sensor side of the responder B, current from the transformer 77 will pass through the leads 78 and 85, the switch arm 88 and the resistor 89 to ground, and thence pass back to the transformer 77 through the grounded part of the lead 71; this will actuate the lamps 72 and 73 and bell 74, because the circuit will be shorted around the resistor 66. If there is no ground on the anti-sensor side of the responder B or its leads to the juncture of the lead 71 with the bell and lamp circuit, then the lamps will not light, and the operator will know that this part of the circuit remains ungrounded.

To test whether the sensor A or it return line is grounded, the switch arm 88 is thrown to make contact with the lead 86. Then, if there is a ground, current will pass from the transformer 77 to the grounded portion and from there through the grounded resistor 89, switch 87, lead 86, and back to the transformer 77 via the lamps 72 and 73 and bell 74. If the lamps are not lighted and the bell does not ring, then there is no ground and this part of the circuit is ungrounded.

As has been said before, there will be no false alarm even if there is a ground in either one of the two halves of the circuit, but there might be the possibility of a false alarm if both sides are grounded. The operator can easily tell whether this is the case by checking the ground circuit. By keeping the circuit from being grounded, there will certainly be no danger of any false alarm.

Figure 11:
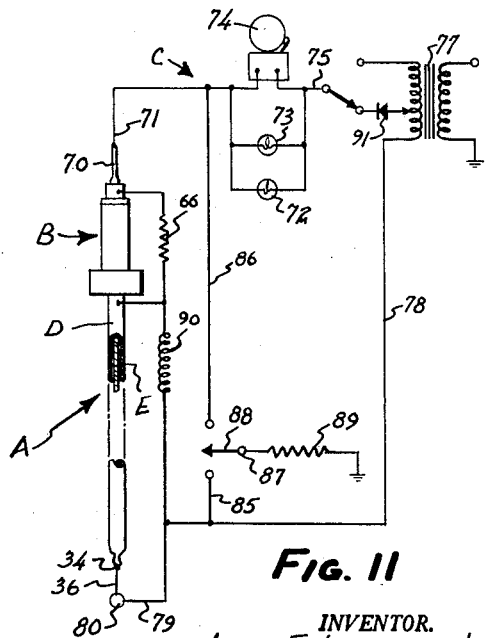
FIG. 11 is a view similar to FIG. 2 of a modified circuit.

If the sensor A is very long (e.g., 100 feet) or if it be made with a tube D of poor conducting properties, then it may be desirable to connect the responder body 41 to the return lead 79 through a low-resistance, high-inductance D.-C. shunting, A.-C. impeding coil 90 (FIG. 11) (e.g., 1 ohm, 20 millihenries, when using 400 cycle current), in parallel with the sensor A; in addition, a rectifier 91 is inserted between the transformer secondary 77 and the terminal 83. Then, the operation will normally be D.-C. through the coil, while the system test is with A.-C. through the sensor A. Of course, D.-C. may also be used with the system illustrated in FIG. 2.

Figure 12:
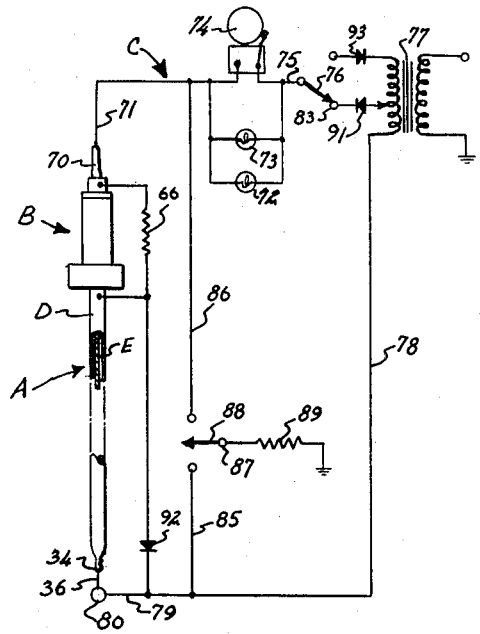
FIG. 12 is a view similar to FIG. 11 of another modified circuit.

Another alternative to the use of the coil and rectifier is to replace the coil 90 with a condenser, test on D.-C. and operate on A.-C. A further alternative (FIG. 12) is to replace the coil 90 with a rectifier 92 of the same direction as the operating direction of the transformer rectifier 91 and providing a reverse polarity rectifier 93 at the transformer for test purposes.

Figure 6:
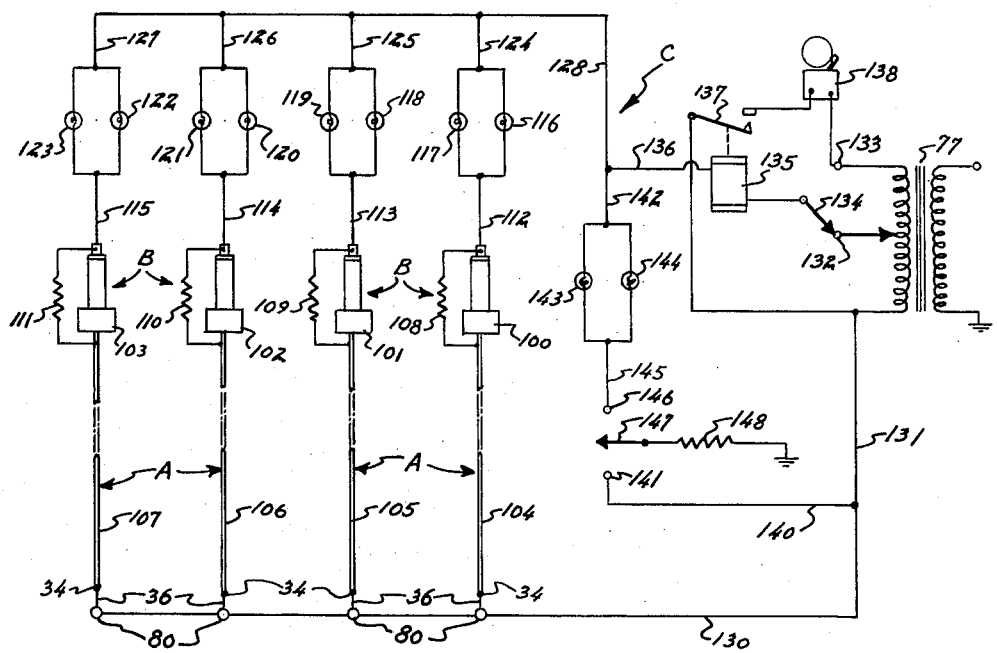
FIG. 6 is a view similar to FIG. 2 of a circuit containing a plurality of responders and sensors.

FIG. 6 shows a system in which a plurality of responders and sensors are used in a single electrical circuit. Here are responders 100, 101, 102, 103 with sensors 104, 105, 106, and 107. Again, there are parallel resistors 108, 109, 110, and 111, one for each responder and each corresponding to the resistor 66. Each responder is connected by a lead 112, 113, 114, 115 to a pair of lamps 116, 117, or 118, 119, or 120, 121, or 122, 123. And each pair of lamps is connected by a lead 124, 125, 126, 127 to a common lead 128. In other words, all the responders are in parallel. Similarly, there is a common return line 130 for all of the sensors. The lead 130 joins the lead 131, which passes to one side of the transformer 77.

The transformer 77 is provided with a low voltage (4 volt) post 132 and a higher voltage (28-volt) post 133. A switch 134 leads through a bell operating relay 135 to lead 136 which is connected to the lead 128. This is the only instance in which a relay is used and this relay is used only for the bell and is completely outside the fire zone. In fact, the relay 135 need not be used if no bell be used; if used, the relay 135 actuates the switch 137 that sends electric current through a suitable bell 138. There is also, again, a ground test circuit including a lead 140 terminating at a post 141 and a lead 142 which passes through a pair of lamps 143 and 144, in parallel, to a lead 145 having a post 146. A ground test switch 147 is connected to ground via a resistor 148.

Operation of the FIG. 6 device is substantially the same as that of the FIG. 2 device with this exception: the test switch 134, when thrown to the post 133, tests all the circuits at once, so that if all the circuits are in order, all the lamps 116 through 123 will light. Their failure to light indicates that either the lamps are burned out or that the circuit is broken.

The ground test switch 147 operates in substantially the same manner as the switch 87. By connecting the switch 147 to the contact 141, current can pass from the transformer through the grounded resistor 148 to a ground point, if there is any, between the responders 100, 101, 102, 103 and their fire signal lamps. If there is a ground, the lamps that are in a grounded segment will be lighted. For the low-side ground, the switch 147 is connected to the post 146, and then a ground on the low side will cause the lamps 143 and 144 to light.

Figure 7:
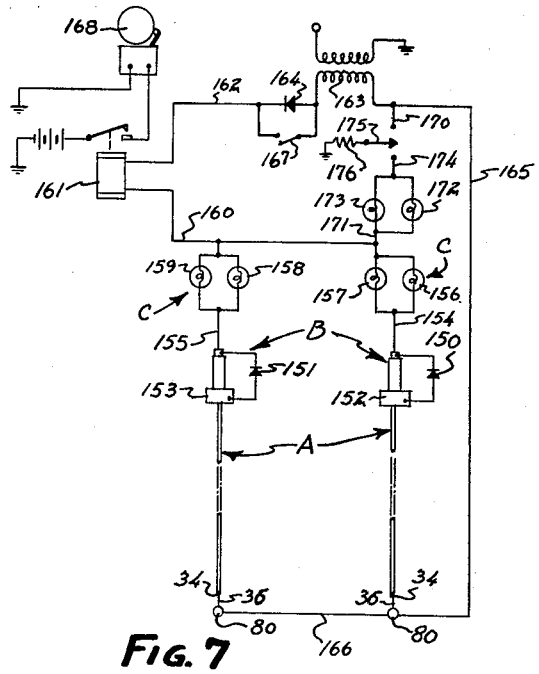
FIG. 7 is a circuit diagram of a modified form of circuit.

FIG. 7 shows a system very similar to the systems of FIGS. 2 and 6 but in which rectifiers 150 and 151 are used instead of the resistors 66 or 108, 109, 110, and 111. The rectifier 150 is in parallel with the responder 152 while the rectifier 151 is in parallel with a responder 153. Leads 154 and 155 respectively connect the responders 152 and 153 and the rectifiers 150 and 151 to parallel lamps 156 and 157 or 158 and 159. Thence, a lead 160 passes through a bell relay 161 to a lead 162 which goes to a transformer secondary 163 through a rectifier 164. The opposite side of the transformer secondary 163 is connected through leads 165 and 166 to the connectors 89 to which the sensors A are connected. A test switch is provided simply by placing a switch 167 in parallel with the rectifier 164. This means that when the test switch is closed, the rectifier 164 is bypassed and alternating current passes through in the direction of the rectifiers 150 and 151. Otherwise, the rectifier 164, being opposite in direction to the rectifiers 150 and 151, will send only D.C. current to the responders 152 and 153 and no current can pass through the rectifiers 150 and 151 because it is going in the wrong direction. As before, actuation of the sensor A by fire conditions will light the lamps of the proper responder while the test circuit will also light the lamps and either of these conditions will also actuate a bell 168 through the relay 161. Ground test is provided by a lead 170 that is connected to the lead 165 and by a lead 171 that passes through parallel lamps 172 and 173 and lead 174. The switch 175 is grounded through a resistor 176. To test for ground, the switch 175 may be first closed against the lead 170, in which instance a ground will cause a lamp 156, 157, 158, or 159 to light, depending on where the ground is located on their side of the responder. Similarly, by closing the ground switch 175 against the lead 174, the lamps 172 and 173 will light if there is a ground.

Figure 8:
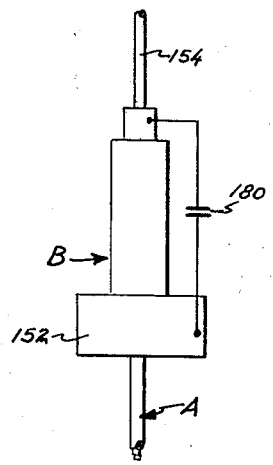
FIG. 8 is a fragmentary enlarged view of a portion of a circuit like that of FIG. 7 with a further modification.

The same system as FIG. 7 may be used by making the modifications shown in FIG. 8, a fragmentary view, wherein condensers 180 are used in place of the rectifiers 150 and 151. The system operates in exactly the same manner.

The rectifier system has these disadvantages as compared with the resistor system: it will tend to short out under heat or when subjected to too high a voltage. The condenser system has the disadvantage that the condenser must be quite large, at least 100 microfarads, and this generally means using an electrolytic condenser, which is usually unwise with alternating current, and which tends to explode if heated to too high a temperature. However, they may be used in suitable environments.

Figure 9:
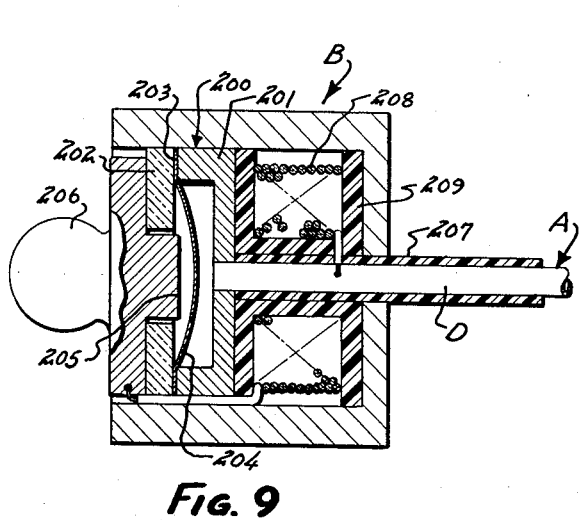
FIG. 9 is a view similar to FIG. 3 of a modified form of responder.

FIG. 9 shows a modified form of responder which may be used with the invention. In this form of the invention the anti-sensor side of the responder is considerably simplified. Again, the responder 200 has its plates 201 and 202 with a diaphragm 203 between them and once again the sensor side has a recessed plate and the diaphragm has a blister 204. A contact electrode 205 is provided which in one piece also comprises the jack 206. The proper gas is introduced at the time of brazing, which means brazing in that kind of atmosphere. The sensor tube D may be a nickel tube brazed in place as before, a Teflon tube 207 being provided on its outer surface which serves to insulate it from a resistor 208, which may again be a wire wound around an insulating spool 209. The resistor 208 is connected across the responder B from the sensor A to the jack 206. Operation is substantially identical to that already described, but manufacturing tolerances and variations in internal pressure conditions will have to be watched carefully.

Figure 10:
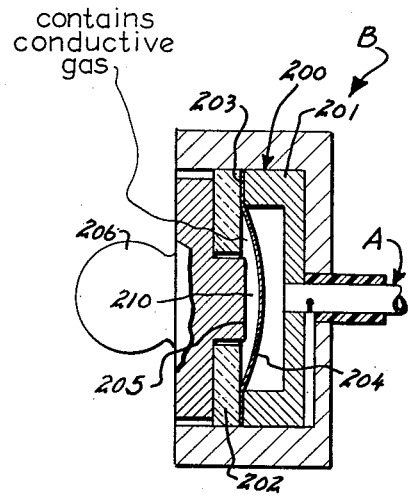
FIG. 10 is a view similar to FIG. 9 of another modified form of responder.

In place of the resistors, rectifiers, or condensers, around the responder B another expedient is possible, as shown in FIG. 10, which shows the responder 200 without any resistor 208. By loading the anti-sensor chamber 210 with neon gas or a mixture of neon and argon to get a desired higher resistance, it is possible to build up resistance directly in the anti-sensor chamber. Then when the test switch is thrown to a higher voltage, the same results will follow, that is, the gas in the anti-sensor chamber 210 will conduct the higher-voltage current. All that need be done is to adjust the transformer value to the proper value, e.g., 100 volts, to cause arcing in the gas in the anti-sensor chamber 210. Thus, in this instance the current is conducted from the sensor A to the responder body 201 and thence to the blister 204. The current arcs across from the blister 204 to the contact member 205 via the neon gas. This, of course, has the advantage of eliminating the resistor 66 or 208. The neon may be at a pressure of 2–3 mm. Hg.

The fire-detection system of this invention is practically indestructible. The sensor A may be tied in a knot and beat on with a hammer without giving a false warning—and it will still detect a fire. The complete system, including sensor sections as long as 12 inches between supports, has been vibrated at 0.25-inch amplitude, 2000 cycles per minute, for 75 hours without failure or false alarm. All components designed to be mounted in the engine compartment, including the responder B and the connector 89, will operate after extensive exposure to 2000° F. flame.

It is virtually impossible for the system to give a false warning—nothing less than an actual fire can cause the detector to give a fire alarm. The system is insensitive to altitude, moisture, and other environmental conditions. It may be immersed with all its terminals exposed in sea water without causing a false warning or impairing its operation. Since the entire circuit is operated ungrounded, a dead short to ground at any point will not cause a false alarm or affect normal operation. In addition, no wiring failure can cause a false alarm. Nor is the system affected by line voltage variations of ±50 percent or more, by power frequency, frequency change, or by power supply waveform.

Moreover, this fire detector surpasses all of the original F.A.A. specifications (FAA–TSO–C11a; SAE specification AS–401a). In response time, the fire detector of this invention surpasses the original F.A.A. specifications by responding to a 1500° F. flame over an 8-inch section of its sensor in 3.6 seconds. A 2000° F. flame over an 8-inch section of sensor causes an alarm in 2.2 seconds or less. Upon removal of the flame condition, the alarm is cleared in three seconds.

The trigger temperature is normally set at the factory at 1000° F., and the detector will respond if either the over-all average temperature of the sensor or the local temperature of any small part of the sensor reaches this point. If required by some installations, the over-all and local trigger temperatures may be set at other values, independent of each other.

Neither response time nor trigger temperature is affected by environmental temperature or by variations in line voltage. The system is insensitive to rates of change of temperature, responding only when the trigger temperature is reached.

Many factors combine to make this fire detector the lightest system ever produced for aircraft use. The sensor A is very light and has no connectors to add weight. There are no heavy components like amplifiers or sensitive relays, and the system requires only one connecting wire per zone plus one common return wire for the whole installation—an important weight-saving feature.

A 30-foot sensor A with responder B and fittings weighs only about four ounces, substantially less than the weight of any other system. A typical DC–8 installation, involving three separate zones per engine, weighs about 19 pounds, including all wiring, signal lamps, sensor support brackets, and other necessary components. Other fire detector systems, some with only one zone per engine, weigh at least 35 pounds and may run well over 50 pounds in a similar installation; if supplied with three zones per engine, their weight would be more than doubled.

The ground-test circuit facilitates maintenance by indicating the area in which a ground exists. The system test tells instantly which parts of the installation are not functioning properly. Thus the time needed to complete a periodic check of the system is greatly reduced.

In the plural unit systems a single test switch tests the integrity of all the sensors in the installation at once, showing immediately if one has been damaged. At the same time all parts of the detector circuit are tested, an advantage not provided by any other existing system. A second test switch determines if any part of the system is grounded. Although a ground will not impair the effectiveness of the system, it is desirable that such a condition be made known so that proper maintenance steps may be taken to preserve the benefits of an ungrounded system.

A unique feature of the test system of FIG. 2 is that it may always be depended upon. If the test shows a particular detector to be inoperative, then that detector will not operate, and vice versa. This feature ends the uncertainty which arises when a warning is given by a detector which has previously tested bad.

Since the system is very low impedance (the critical impedance is negligible when sensing a fire) the detector does not depend upon moisture sealing for integrity; in fact, the entire circuit, with all terminals exposed, may be immersed in sea water without causing false warning or impairing its operaton.

To those skilled in the art to which this invention relates, many changes in construction and widely differing embodiments and applications of the invention will suggest themselves without departig from the spirit and scope of the invention. The disclosures and the description herein are purely illustrative and are not intended to be in any sense limiting.

I claim:

1. A fire-detection system comprising an electrically conductive tube containing a transducing agent that releases large quantities of gas when heated to fire temperatures; an electrically conductive diaphragm; a housing divided by said diaphragm into two chambers, namely, a first chamber in communication with said transducing agent and the gas released therefrom and a second chamber isolated therefrom; an electrode in said second chamber adapted to be contacted by said diaphragm when the pressure in said first chamber reaches a predetermined value; a source of electrical current; a signal device in series with said source, said electrode, said diaphragm, and said tube, said signal device requiring a certain current level for actuation, said level being exceeded upon closure of said diaphragm against said electrode; and test means for passing current between said electrode and said tube in amount sufficient to actuate said signal device regardless of the position of said diaphragm.

2. The system of claim 1 wherein there is a first switch terminal connected in said circuit between said electrode and said signal device, and a second switch terminal connected in said circuit to said diaphragm through said tube, a switch arm connectible to either said switch terminal, and a resistor of impedance corresponding approximately to the series impedance of said tube, diaphragm and electrode, one side of said resistor being grounded and the other side being connected to said switch arm.

3. The system of claim 1 wherein said signal device includes a plurality of lamps in parallel with each other.

4. A temperature-detection system comprising an electrically conductive tube containing means for releasing significant quantities of gas when heated to a predetermined tempertaure; an electrically conductive diaphragm; a housing divided by said diaphragm into two chambers, namely, a first chamber in communication with the interior of said tube and a second chamber isolated therefrom; an electrode in said second chamber against which said diaphragm is closed by movement of said diaphragm due to a predetermined increase in pressure in said first chamber; an ungrounded electrical circuit connecting said electrode in series with said diaphragm, said tube and a source of electrical current, said circuit having signal means in series with said electrode and actuated upon contact of said electrode by said diaphragm, said circuit also having an electrical resistor in parallel with said electrode and diaphragm, the amount of current passing through said resistor normally being insufficient to actuate said signal means; and means for increasing the current flow through said resistor to a level sufficient to actuate said signal means.

5. A temperature-detection system comprising an electrically conductive tube containing means for releasing significant quantities of gas when heated to a predetermined temperature; an electrically conductive diaphragm; a housing divided by said diaphragm into two chambers, namely, a first chamber in communication with the interior of said tube and a second chamber isolated therefrom; an electrode in said second chamber against which said diaphragm moves when the pressure in said first chamber is increased by the release of gas at said predetermined temperature; and an ungrounded electrical circuit connecting said electrode in series with said diaphragm and said tube and having a source of alternating current in said series, said circuit also having a first rectifier and signal means in series with said first rectifier and said electrode and actuated by closure of said diaphragm against said electrode, said circuit also having a second rectifier of opposite direction to said first rectifier in parallel with said electrode and diaphragm, and a test switch in parallel with said first rectifier for bypassing it and sending current flow through said second rectifier to actuate said signal means.

6. A temperature-detection system comprising an electrically conductive tube containing means for releasing significant quantities of gas when heated to a predetermined temperature; an electrically conductive diaphragm; a housing divided by said diaphragm into two chambers, namely, a first chamber in communication with the interior of said tube and a second chamber isolated therefrom; an electrode in said second chamber against which said diaphragm moves when the pressure in said first chamber is increased by the release of gas at said predetermined temperature; and an ungrounded electrical circuit connecting said electrode in series with said diaphragm and said tube and with a source of electrical alternating current, said circuit having a rectifier and signal means in series with and between said rectifier and said electrode and actuated by closure of said electrode, said circuit also having an electrical condenser in parallel with said electrode and diaphragm, and a test switch in parallel with said rectifier for bypassing it and sending alternating current through said condenser to actuate said signal means.

7. A temperature-detection system comprising an electrically conductive tube containing means for releasing significant quantities of gas when heated to a predetermined temperature; an electrically conductive diaphragm; a housing divided by said diaphragm into two chambers, namely, a first chamber in communication with the interior of said tube and a second chamber isolated therefrom and containing a second gas which becomes electrically conductive at a predetermined voltage; an electrode in said second chamber against which said diaphragm can move; and an ungrounded electrical circuit connecting said electrode in series with said diaphragm, said tube and with a source of electrical current at a voltage lower than that needed to render said second gas conductive, said circuit having signal means in series with said electrode and actuated by closure of said diaphragm against said electrode, said circuit also having means for increasing the voltage to a level sufficient to make said second gas conductive and thereby to actuate said signal means even when said diaphragm is not in contact with said switch element.

8. A temperature detection system comprising an electrically conductive tube containing means for releasing significant quantities of gas when heated to a predetermined temperature; an electrically conductive diaphragm; a housing divided by said diaphragm into two chambers, namely, a first chamber in communication with the interior of said tube and a second chamber isolated therefrom; an electrode in said second chamber against which said diaphragm moves when the pressure in said first chamber in increased by the release of gas at said predetermined temperature, whereby said electrode and diaphragm comprise a pressure-actuated electrical switch; and an ungrounded electrical circuit connecting said switch in series with said tube and with a source of alternating current, said circuit having a rectifier and a signal means in series with and between said rectifier and said switch and actuated by closure of said switch, said circuit also having a resistor in parallel with said switch and a low resistance coil in parallel with said tube and in series with said resistor to afford a low-resistance bypass around said tube, and a test switch for connecting said circuit to said source directly or, alternately, through said rectifier and serving when connected directly to send alternating current through said resistor and said tube to actuate said signal means.

9. A temperature detection system comprising an electrically coductive tube containing means for releasing significant quantities of gas when heated to a predetermined temperature; an electrically conductive diaphragm; a housing divided by said diaphragm into two chambers, namely, a first chamber in communication with the interior of said tube and a second chamber isolated therefrom; and electrode in said second chamber against which said diaphragm moves when the pressure in said first chamber is increased by the release of gas at said predetermined temperature, whereby said electrode and diaphragm comprise a pressure-actuated electrical switch; and an ungrounded electrical circuit connecting said switch in series with said tube and with a source of alternating current, said circuit having a first rectifier and a signal means in series with and between said rectifier and said switch and actuated by closure of said switch, said circuit also having a resistor in parallel with said switch and a second rectifier of the same direction as said first rectifier in parallel with said tube and in series with said resistor to afford a low-resistance bypass around said tube, and a third rectifier connected to said source and of opposite direction to said first rectifier and a test switch for connecting said circuit to said source through each of said first and third rectifiers alternately, and serving when connected to said third rectifier to send current through said resistor and said tube to actuate said signal means.

10. A critical-temperature detection system comprising a plurality of heat-to-pressure transducing means; a corresponding plurality of responder means, each operatively connected to one said transducing means and moved by a substantial increase in pressure caused by said transducing means being externally heated; an ungrounded electrical circuit connecting each responder in parallel with the others and having a warning-indicator means for and in series with each said responder and each actuated by movement of its said responder means for indicating detection of said critical temperature; and single test means for said circuit for independently electrically actuating all said warning-indicator means simultaneously.

11. The system of claim 10 wherein said circuit is provided with second test means for determining whether parts of said circuit are grounded.

12. A critical-temperature detection system comprising a plurality of generally filamentary electrically conductive enclosures of extended length; means in each said enclosure responsive to heat for increasing the pressure within that said enclosure by a substantial amount; a plurality of electrical circuits, each employing a said enclosure as a portion thereof and incorporating a warning device, an electrical switch, and an impedance in parallel with said switch; a corresponding plurality of pressure-actuated means for actuating each said switch in response to the pressure in the said enclosure that is associated with that switch, all said circuits being joined in parallel with each other and single electrical test means for sending enlarged current through all said impedances simultaneously, independently of said switches, in magnitude sufficient to actuate said warning devices.

13. The system of claim 12 having means to test whether any of said enclosures is grounded.

14. A fire detection system comprising a plurality of electrically conductive tubes, each containing a transducing agent that releases large quantities of gas when heated to fire temperatures; a corresponding plurality of electrically conductive diaphgrams; a corresponding plurality of housings each divided by a said diaphragm into two chambers, namely, a first chamber in communication with a said transducing agent in a said tube and the gas released therefrom and a second chamber isolated therefrom; a corresponding plurality of electrodes, one in each said second chamber adapted to be contacted by a said diaphragm when the pressure in that said first chamber reaches a predetermined value; a signal device in series with each said electrode, said diaphragm, and said tube to comprise a plurality of warning circuit segments, each said signal device requiring a certain current level for actuation, said level being exceeded upon closure of the signal device's said diaphragm against its said electrode, all said circuit segments being connected in parallel with each other; a single source of electrical current in series with said segments; and single test means for passing current between all said electrodes and their said tubes in an amount sufficient to actuate all said signal devices.

15. The system of claim 14 wherein there is a connection between the electrode side of said parallel segments and said single source through another signal device to a switch terminal and a connection to a second switch terminal from the tube side of said parallel segments, and a switch arm connectible to either said switch terminal and leading to ground through a resistor whose resistance is substantially the same as that of each of said tubes, to test whether either side of said circuit is grounded.

16. A pressure-responsive switch, including in combination: a first metal housing member; a second metal housing member; a metal diaphragm sealed between said housing members and having a circular area whose periphery is rigidly fixed to said housing members, said area being deformed to provide a blister normally depressed toward said first housing member, said diaphragm and said first housing member cooperating to provide a first chamber, said diaphragm and said second housing cooperating to provide a second chamber; an electrode insulated from said diaphragm and mounted in said second chamber directly opposite said blister; a resistor connected between said electrode and said diaphragm; and electrical conduction means connected to each of said electrode and said first housing member, so that flexure of said blister due to a pressure differential between said first and second chambers can cause contact between said blister and said electrode, which then act as an electrical switch bypassing said resistor.

17. A pressure-responsive switch, including in combination: a first metal housing member; a second metal housing member; a metal diaphragm sealed between said housing members and having a circular area whose periphery is rigidly fixed to said housing members, said area being deformed to provide a blister normally depressed toward said first housing member, said diaphragm and said first housing member cooperating to provide a first chamber, said diaphragm and said second housing cooperating to provide a second chamber; an electrode insulated from said diaphragm and mounted in said second housing directly opposite said blister; a gas under low pressure in said second chamber, said gas being electrically conductive at a certain voltage level, and electrical conduction means for each of said electrode and said diaphragm, so that flexure of said blister due to a pressure differential between said first and second chambers can cause contact between said blister and said electrode, which then act as an electrical switch and so that when high voltage is provided it can arc from said diaphragm to said electrode via said gas.

18. A pressure-responsive switch, including in combination: a first metal housing member; a second metal housing member; a metal diaphragm sealed between said housing members and having a circular area whose periphery is rigidly fixed to said housing members, said area being deformed to provide a blister normally depressed toward said first housing member, said diaphragm and said first housing member cooperating to provide a first chamber, said diaphragm and said second housing cooperating to provide a second chamber; an electrode insulated from said diaphragm and mounted in said second housing directly opposite said blister; a mixture of neon and argon under low pressure in said second chamber; and electrical conduction means for each of said electrode and said diaphragm, so that flexure of said blister due to a pressure differential between said first and second chambers can cause contact between said blister and said electrode, which then act as an electrical switch and so that when high voltage is provided it can arc from said diaphragm to said electrode via said mixture.

References Cited by the Examiner
UNITED STATES PATENTS

| | | | |
|---|---|---|---|
| 1,056,459 | 3/13 | Shepherd | 340—229 |
| 1,071,171 | 8/13 | Nolen | 340—229 |
| 2,566,367 | 9/51 | Peters | 340—214 |
| 2,624,025 | 12/52 | Deloraine et al. | 313—148 X |
| 2,647,237 | 7/53 | Herbst | 340—255 X |
| 2,648,475 | 7/55 | Lode | 340—255 X |
| 2,709,249 | 5/55 | Sperry | 340—213 |
| 2,753,548 | 7/56 | Gates | 340—227 X |
| 2,871,466 | 1/59 | Vassil et al. | 340—229 |

FOREIGN PATENTS

| | | |
|---|---|---|
| 587,060 | 4/47 | Great Britain. |
| 666,003 | 2/52 | Great Britain. |
| 307,107 | 4/33 | Italy. |

OTHER REFERENCES

Loewe: "Check That Ground," Allis Chalmers Electrical Review, Second Quarter 1948, Figs. 1–5.

NEIL C. READ, *Primary Examiner.*

E. JAMES SAX, *Examiner.*

UNITED STATES PATENT OFFICE
CERTIFICATE OF CORRECTION

Patent No. 3,195,121

July 13, 1965

John E. Lindberg, Jr.

It is hereby certified that error appears in the above numbered patent requiring correction and that the said Letters Patent should read as corrected below.

Column 7, line 74, for "it" read -- its --; column 13, line 13, for "in" read -- is --; line 35, for "and", second occurrence, read -- an --; column 16, line 12, for "2,648,475" read -- 2,684,475 --.

Signed and sealed this 25th day of January 1966.

(SEAL)
Attest:

ERNEST W. SWIDER
Attesting Officer

EDWARD J. BRENNER
Commissioner of Patents